United States Patent
Rossi

(10) Patent No.: US 7,980,623 B2
(45) Date of Patent: Jul. 19, 2011

(54) WIND-STOP DEVICE FOR A TWO-SEATER CONVERTIBLE

(75) Inventor: Massimo Rossi, Turin (IT)

(73) Assignee: Fiat Group Automobiles S.p.A., Turin (IT)

( * ) Notice: Subject to any disclaimer, the term of this patent is extended or adjusted under 35 U.S.C. 154(b) by 0 days.

(21) Appl. No.: 12/633,144

(22) Filed: Dec. 8, 2009

(65) Prior Publication Data

US 2010/0276968 A1 Nov. 4, 2010

(30) Foreign Application Priority Data

Apr. 30, 2009 (EP) .................................. 09425169

(51) Int. Cl.
*B60J 9/00* (2006.01)
(52) U.S. Cl. ................................ 296/180.2; 296/180.1
(58) Field of Classification Search .............. 296/180.1, 296/180.2, 217
See application file for complete search history.

(56) References Cited

U.S. PATENT DOCUMENTS

| | | | | |
|---|---|---|---|---|
| 5,024,481 A * | 6/1991 | Swersky | .................... | 296/180.1 |
| 5,318,337 A * | 6/1994 | Gotz et al. | .................. | 296/180.1 |
| 5,803,530 A * | 9/1998 | Skrzypek et al. | .......... | 296/180.1 |
| 5,810,424 A * | 9/1998 | Kuttner et al. | .............. | 296/180.1 |
| 5,839,774 A * | 11/1998 | Hack et al. | .................. | 296/180.1 |
| 5,899,521 A * | 5/1999 | Pfertner et al. | ............. | 296/180.1 |
| 6,092,860 A * | 7/2000 | Zankl et al. | ................. | 296/180.1 |
| 6,378,930 B1 * | 4/2002 | Brettmann | ................. | 296/180.1 |
| 6,557,928 B2 * | 5/2003 | Dreher et al. | .............. | 296/180.1 |
| 6,582,008 B2 * | 6/2003 | Riehle et al. | ................ | 296/180.1 |
| 6,692,063 B2 * | 2/2004 | Dreher et al. | .............. | 296/180.1 |
| 6,902,225 B2 * | 6/2005 | Schmitt et al. | ............. | 296/180.1 |
| 6,926,062 B2 * | 8/2005 | Neumann et al. | .......... | 296/180.1 |
| 7,226,118 B2 * | 6/2007 | Kreis et al. | ................. | 296/180.1 |
| 7,699,381 B2 * | 4/2010 | Goetz et al. | ................ | 296/180.1 |
| 7,766,415 B2 * | 8/2010 | Riehle et al. | .............. | 296/180.1 |
| 2008/0238155 A1 | 10/2008 | Pennington | | |

FOREIGN PATENT DOCUMENTS

| | | |
|---|---|---|
| DE | 92 13 699.0 | 1/1993 |
| DE | 197 31 326 | 1/1999 |
| DE | 103 11 837 | 7/2004 |
| DE | 10 2005 048 962 | 4/2007 |
| DE | 10 2006 049 776 | 10/2007 |

OTHER PUBLICATIONS

Search Report for EP 09425169.1 dated Oct. 5, 2009.

* cited by examiner

*Primary Examiner* — Lori L Lyjak
(74) *Attorney, Agent, or Firm* — Nixon & Vanderhye P.C.

(57) ABSTRACT

A wind-stop device for a two-seater convertible comprises a panel provided with means for its removable anchorage behind the backrests of the seats of the automobile, between two roll-hoops anchored to the structure of the automobile, behind the seats. The anchorage means comprise at least one pair of lateral tabs projecting from the panel and designed to be received within guide slits made in the inner sides of the two roll-hoops and at least one blocking tongue projecting at the bottom from the panel and designed to co-operate with a receiving and blocking device in the form of a buckle for safety belts, rigidly connected to the structure of the motor vehicle and having a receiving seat open upwards, set at the top of a wall at the back of the two seats with a release button adjacent to the seat.

4 Claims, 4 Drawing Sheets

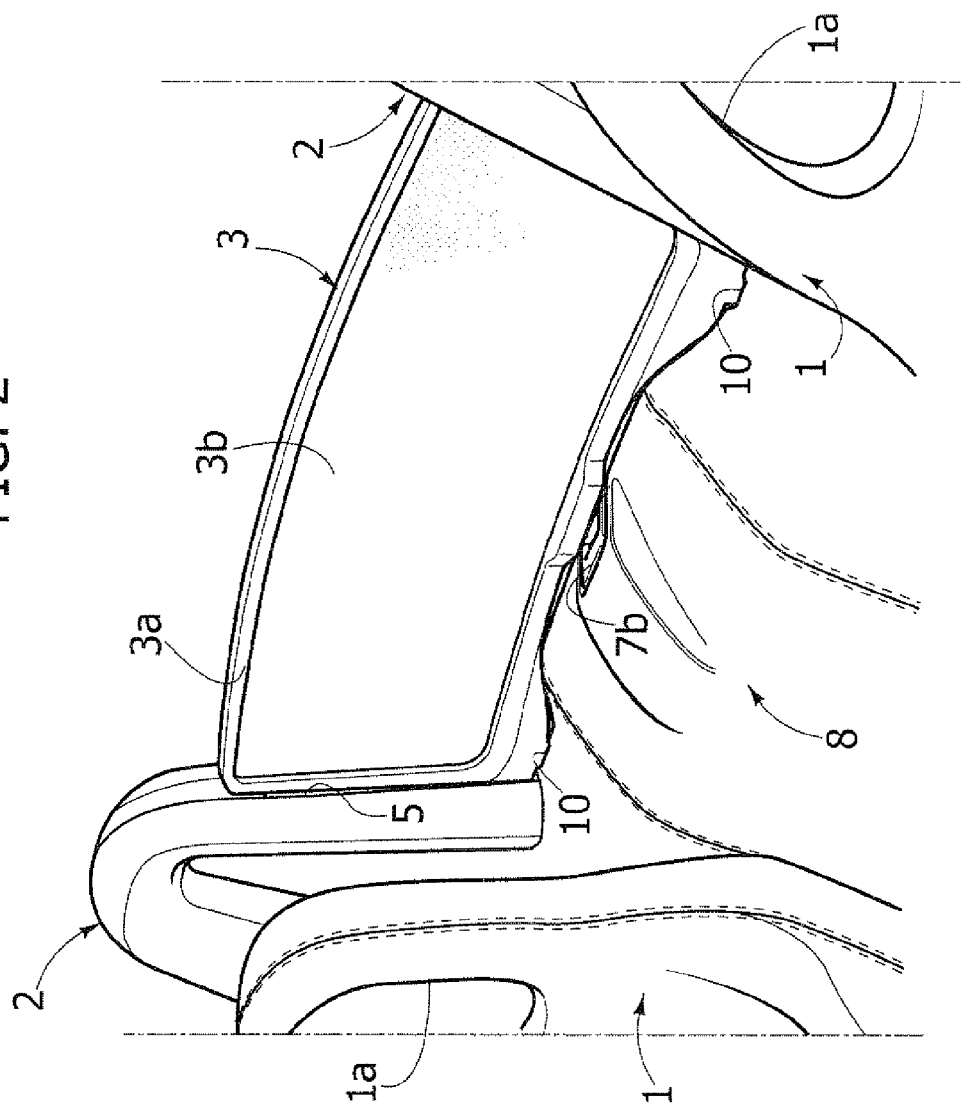

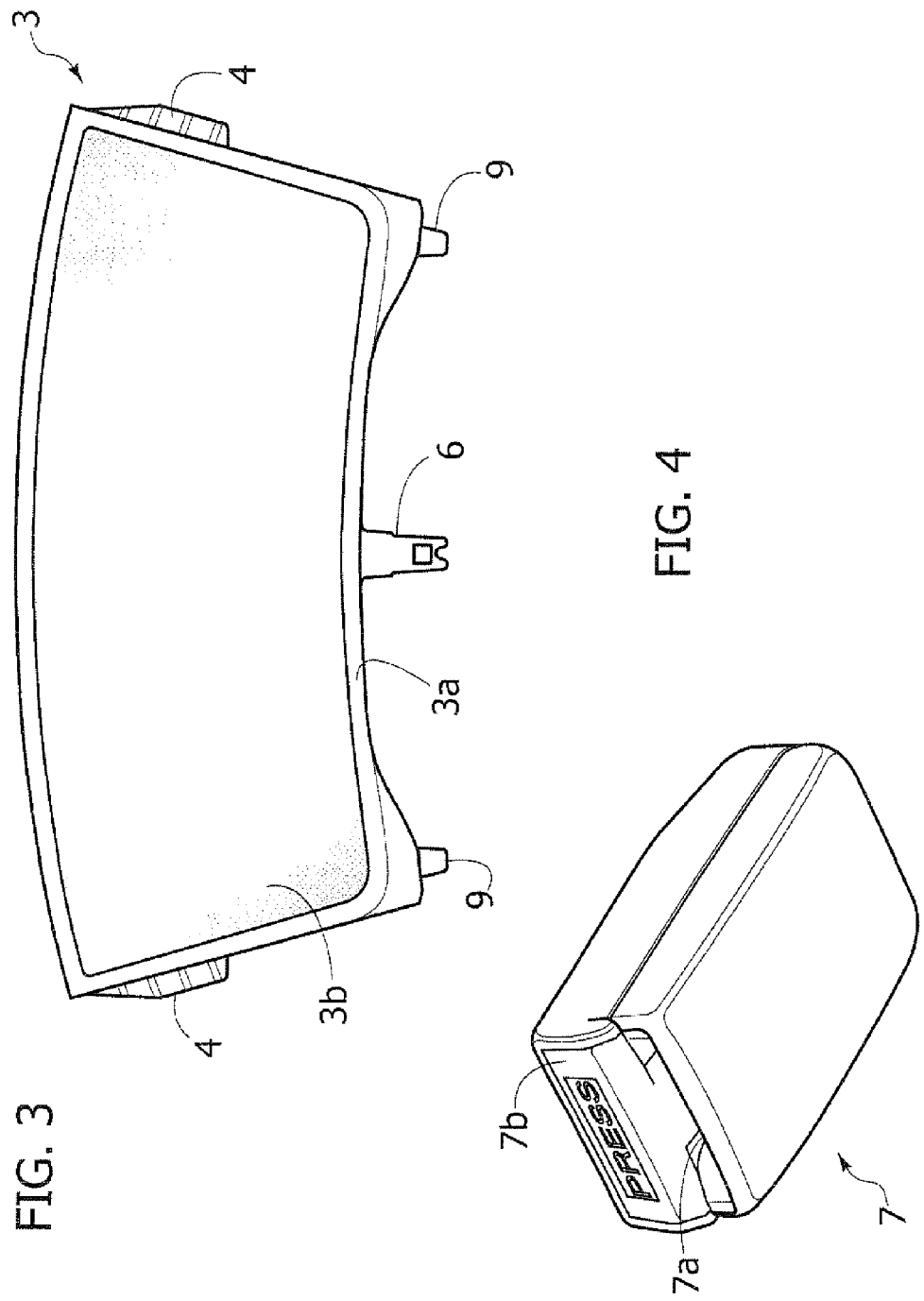

WIND-STOP DEVICE FOR A TWO-SEATER CONVERTIBLE

This application claims priority to European Patent Application No. 09425169.1 filed 30 Apr. 2009, the entire contents of which is hereby incorporated by reference.

BACKGROUND OF THE INVENTION

The present invention relates to wind-stop devices that are used in automobiles of the convertible type, when the roof of the automobile is in the folded condition, in order to reduce the turbulence of air within the passenger compartment when the vehicle is travelling.

In particular, the invention relates to wind-stop devices for two-seater convertibles, of the type comprising a panel provided with means for its removable anchorage behind the backrests of the seat of the automobile between two protection bars for support in the event of the vehicle turning over, the so-called "roll-hoops", which are anchored to the structure of the automobile behind the seats.

SUMMARY OF THE INVENTION

The object of the present invention is to provide a wind-stop device of the type referred to above that will present a structure that is simple and at the same time functional, guaranteeing, in particular, simple and fast operations for its assembly in position and its removal, as well as a firm and secure anchorage, free from vibrations and consequent noise.

A further object of the invention is to achieve said aims with an extremely simple and low-cost structure.

With a view to achieving the above objects, the subject of the invention is a wind-stop device of the type referred to at the start of the present description, characterized in that the aforesaid means of removable anchorage comprise at least one pair of lateral tabs, which project from the panel and are designed to be received within guide slits made in the inner sides of the two roll-hoops, and at least one bottom blocking tongue, projecting at the bottom from the panel and designed to co-operate with a receiving and blocking device in the form of a buckle for a safety belt, said device being rigidly connected to the structure of the motor vehicle and to a receiving seat open upwards, set at the top of a wall at the back of the two seats, with a blocking button provided adjacent to said receiving seat.

Thanks to the aforesaid characteristics, the wind-stop device according to the invention can be implemented with an extremely simple and low-cost structure, since for its blocking in position a blocking device altogether similar to a buckle for a standard-production safety belt can be used.

The solution according to the invention is consequently far simpler and more functional as compared to a variety of solutions so far proposed and used for wind-stop devices in automobiles of the type described herein.

BRIEF DESCRIPTION OF THE DRAWINGS

Further characteristics and advantages of the invention will emerge from the ensuing description, with reference to the annexed drawings, which are provided purely by way of non-limiting example and in which:

FIG. 2 is a perspective view corresponding to that of FIG. 1, in which the wind-stop device of the invention is illustrated in its mounted condition;

FIG. 3 is a further view of the panel of the device;

FIG. 4 is a perspective view of a buckle for a standard-production safety belt of the type usable in the device according to the invention.

DETAILED DESCRIPTION OF THE INVENTION

Figure 1:
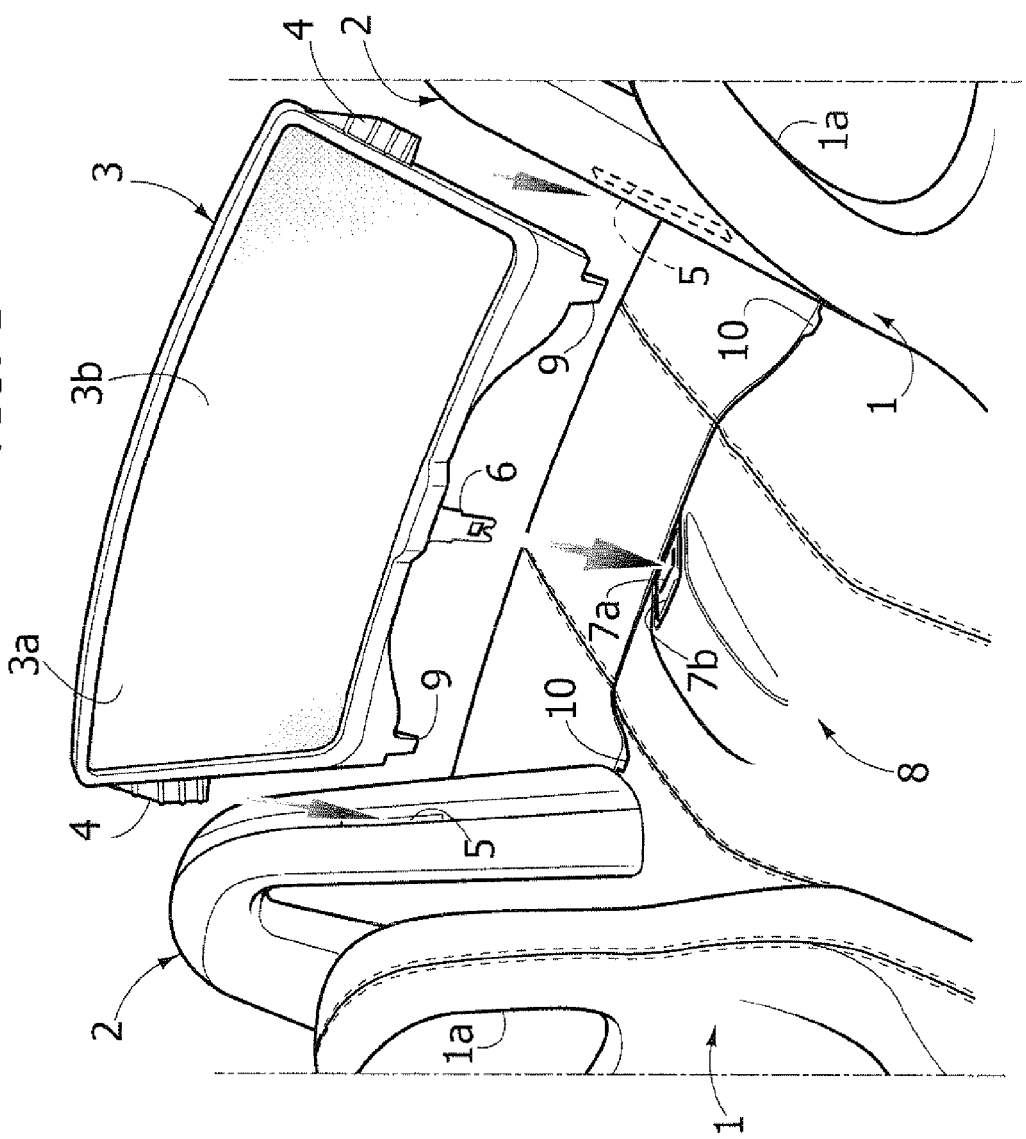
FIG. 1 is a perspective view of a detail of a two-seater convertible in the condition with the roof folded and with the wind-stop device according to the invention set in the position ready for its assembly.
Figure 5:
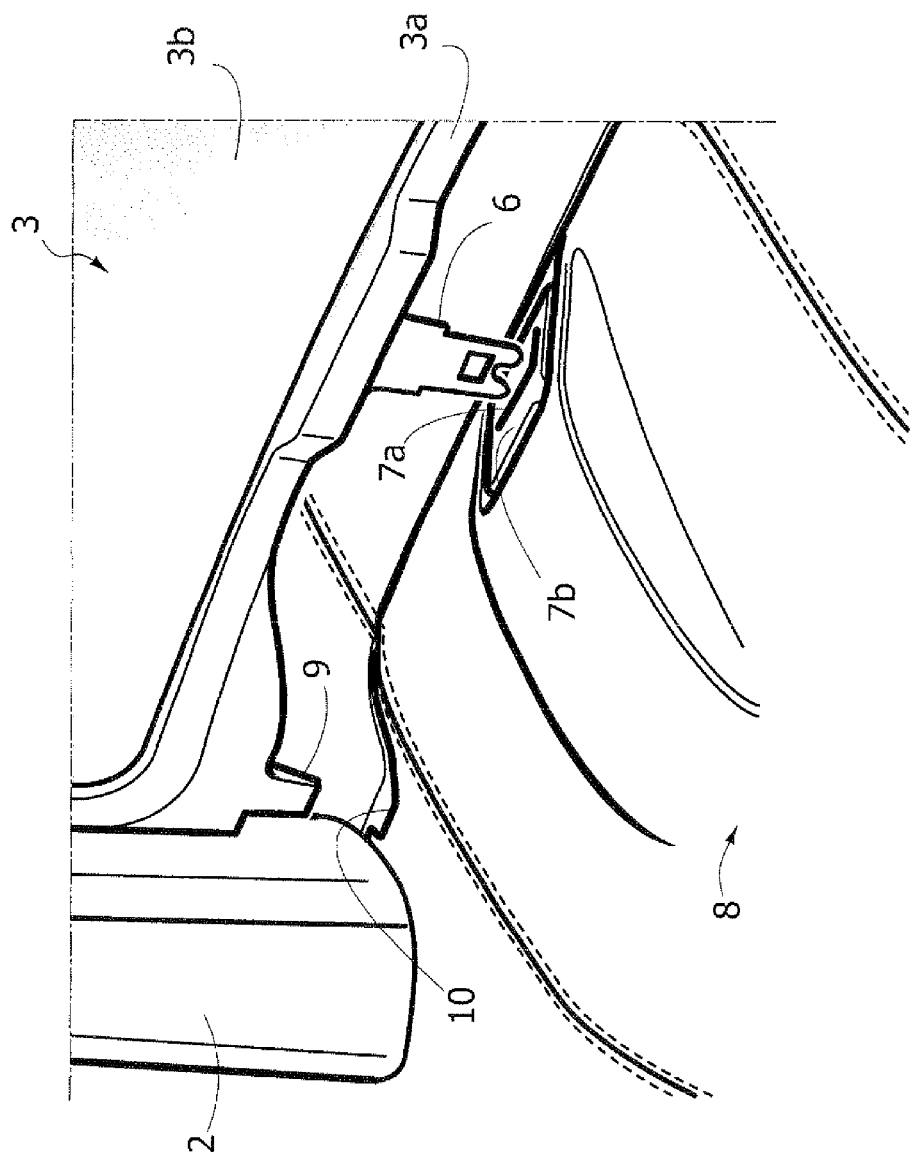
FIG. 5 is a detail of the device that illustrates the central bottom tongue, designed to co-operate with the receiving and blocking device of FIG. 4.

Partially visible in FIGS. 1 and 2 are the front seats 1 in the passenger compartment of a two-seater convertible of the type where two protection bars or roll hoops 2 are provided for support in the event of the vehicle turning over, which are substantially in the form of trestles shaped like a V turned upside down, anchored to the structure of the vehicle behind the two seats 1 and projecting above the headrests 1a of said seats.

The reference number 3 indicates as a whole the panel of a wind-stop device designed to prevent, or at least reduce, the formation of vortices of air within the passenger compartment of the motor vehicle when it is travelling when the roof is in the folded condition. The panel 3 is made in any known way. For example, the panel 3 can be constituted by a frame 3a made of plastic material, extending within which is a rigid or flexible wall 3b, for instance constituted by a canvas or a mesh. The details of the structure of the frame 3a and of the wall 3b are not described herein since, as has already been mentioned, they can be made in any known way.

In order to enable removable anchorage of the panel 3 to the structure of the vehicle, the panel 3 has a pair of lateral tabs 4 designed to be received within guide slits 5 made in the inner sides of the two roll-hoops 2. Furthermore, the panel 3 comprises a central bottom tongue 6, designed to co-operate with a receiving and blocking device 7 (FIG. 4) that is provided set-in on the top of a wall 8 at the back of the seats 1.

As may be seen in FIG. 4, the receiving and blocking device 7 is constituted by a buckle for standard-production safety belts that is set-in in the wall 8 and is connected rigidly in any known way (for example, by screwing or welding) to the structure of the motor vehicle. The device 7 has a receiving seat 7a (open upwards) set flush with the top of the wall 8, designed to receive the central bottom tongue 6 of the panel 3 and is moreover equipped with a blocking button 7b adjacent to the receiving seat 7a.

In the example of embodiment illustrated, the panel 3 is moreover equipped with a further pair of bottom tabs 9, set at the two sides of the panel 3 and designed to co-operate with corresponding seats 10 made on the top of the wall 8. The tabs 9, like the tabs 4 purely have a function of guide and retention, whilst the blocking in position of the panel 3 is entrusted exclusively to the device 7 and to the tongue 6 co-operating therewith.

As may be clearly seen in FIGS. 1 and 2, the inner sides of the two roll-hoops 2 mutually converging downwards as a result of the conformation of each of said roll-hoops 2. The panel 3 is likewise shaped with inclined sides converging downwards according to the inclination of the inner sides of the roll-hoops 2.

As may be seen, in the mounted condition illustrated in FIG. 2, the panel 3 is set in a plane transverse with respect to the longitudinal direction of the motor vehicle, in the space comprised between the inner sides of the two roll-hoops 2 and above the wall 8 situated behind the seats 1 of the automobile.

In order to proceed to assembly of the panel 3, the latter is prearranged in the position illustrated in FIG. 1, with the lateral tabs 4, the central bottom tongue 6, and the bottom lateral tabs 9 aligned with the respective seats 10. Starting from said position, blocking is obtained automatically by lowering the panel 3, until blocking of the tongue 6 in the receiving and blocking device 7 is obtained in a way altogether similar to what occurs at the moment of blocking of a tongue of a safety belt in the respective buckle. Once mounted in the position illustrated in FIG. 2, the panel 3 can be removed by first pressing the pushbutton 7b at the top of the wall 8 at the back of the seats so as to obtain release of the central bottom tongue 6 and then raising the panel 3 up to complete separation of the tabs 4 and 9 from the respective seats 5 and 10. The wind-stop device can of course be equipped with a case for housing it within the boot of the automobile when it is not being used.

As emerges clearly from the foregoing description, the device according to the invention is characterized by an extreme simplicity and economy of production, albeit guaranteeing at the same time an extreme simplicity and rapidity of the operations of assembly and disassembly and a firm and secure blocking in the position of use, which guarantees the absence of vibrations and of consequent noise when the vehicle is travelling.

Of course, without prejudice to the principle of the invention, the details of construction and the embodiments may vary widely with respect to what is described and illustrated herein, without thereby departing from the scope of the present invention.

What is claimed is:

1. A wind-stop device for a two-seater convertible automobile, comprising a panel provided with means for the panel's removable anchorage behind backrests of the seats of the automobile between two roll-hoops anchored to a structure of the automobile behind the seats, wherein said anchorage means comprise at least one pair of lateral tabs projecting from the panel designed to be received within guide slits made in the inner sides of the two roll-hoops, and at least one blocking tongue, projecting at the bottom from the panel and designed to co-operate with a receiving and blocking device in the form of a buckle for safety belts, rigidly connected to the structure of the automobile, and having a receiving seat open upwards, set at the top of a wall at the back of the two seats, and a blocking button adjacent to said receiving seat.

2. The device according to claim 1, wherein said panel has a substantially plane conformation, with two inclined sides converging downwards, said lateral tabs and said bottom blocking tongue extending substantially in the general plane of said panel.

3. The device according to claim 2, wherein said panel has a single bottom blocking tongue, co-operating with a single receiving and blocking device, and in that the panel is moreover provided with two bottom lateral tabs co-operating with respective seats provided on the top of said rear wall.

4. A two-seater convertible automobile, comprising two roll-hoops anchored to the structure of the automobile, behind two seats and a wind-stop device that comprises a panel provided with means for the panel's removable anchorage behind backrests of the seats of the automobile, between the two aforesaid roll-hoops, wherein said anchorage means comprise at least one pair of lateral tabs projecting from the panel, designed to be received within guide slits made in the inner sides of the two roll-hoops, and at least one blocking tongue, projecting at the bottom from the panel and designed to co-operate with a receiving and blocking device in the form of a buckle for a safety belt, which is rigidly connected to the structure of the automobile and has a receiving seat open upwards, set at the top of a wall at the back of the two seats, and a blocking button adjacent to said seat.

* * * * *